March 7, 1967 H. R. BOWERS ETAL 3,308,201
PURIFICATION OF HYDROCARBONS
Filed March 8, 1966
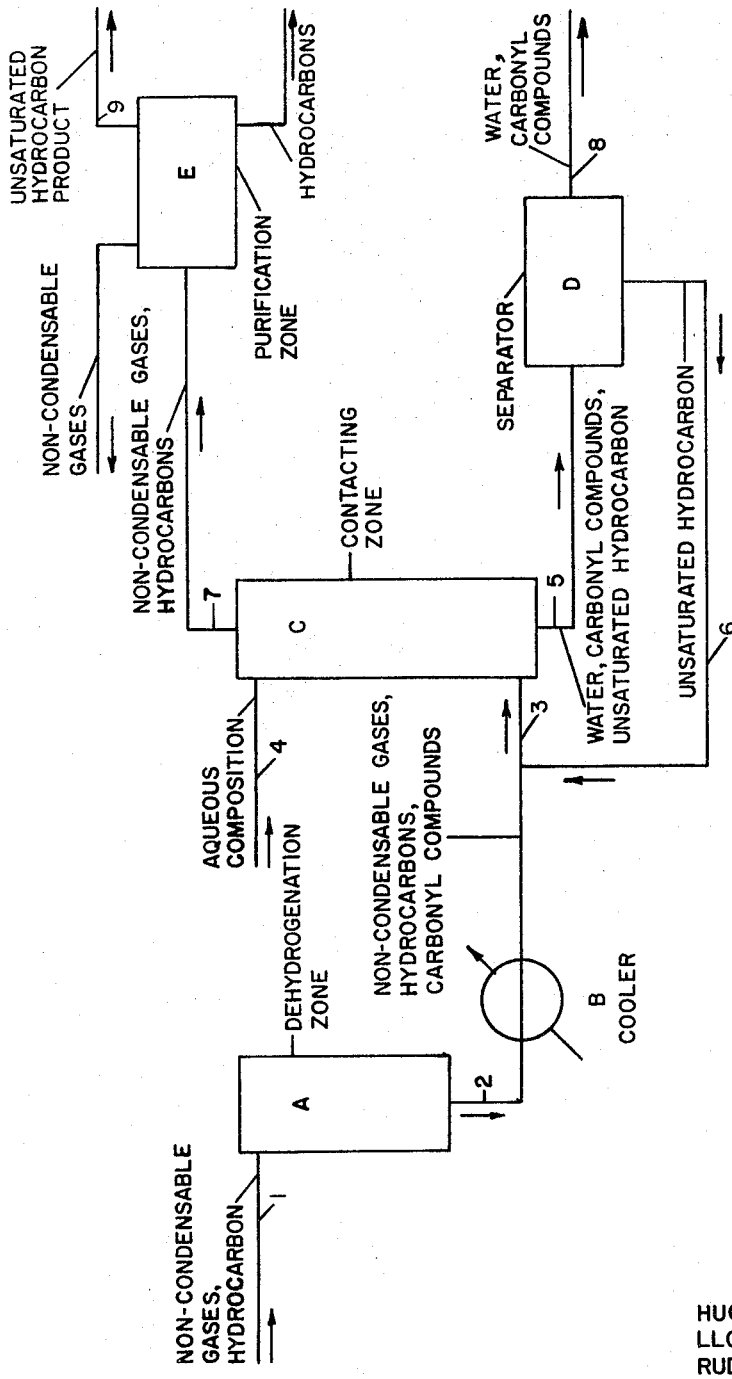
HUGH R. BOWERS
LLOYD D. TSCHOPP
RUDOLPH C. WOERNER
INVENTORS
BY D. Baxter Dunaway
ATTORNEY United States Patent Office 3,308,201
Patented Mar. 7, 1967

3,308,201
PURIFICATION OF HYDROCARBONS
Hugh R. Bowers, Lloyd D. Tschopp, and Rudolph C. Woerner, all of Houston, Tex., assignors to Petro-Tex Chemical Corporation, Houston, Tex., a corporation of Delaware
Filed Mar. 8, 1966, Ser. No. 532,795
6 Claims. (Cl. 260—681.5)

This application relates to a process for the purification of unsaturated hydrocarbons from a gaseous mixture containing hydrocarbons, relatively non-condensable but gases and carbonyl compounds.

Unsaturated hydrocarbons are commercially produced by the catalytic dehydrogenation of more saturated hydrocarbons. For example, diolefins are produced in large quantities by the dehydrogenation of saturated hydrocarbons or olefins in fixed bed reactors. Improved processes whereby higher conversions, yields and selectivities of product as well as other improvements are desired.

Improved processes for the preparation of unsaturated hydrocarbons such as butene, butadiene-1,3, isoprene and styrene are processes whereby hydrocarbons such as butane, butene, isopentenes or ethyl benzene are dehydrogenated at elevated temperatures in the presence of catalysts and oxygen. Superior results and yields of product are thereby obtained. However, the product streams contain not only the desired unsaturated hydrocarbon, but also various oxykenated compounds such as aldehydes and other carbonyl compounds. When air is used as the source of the oxygen, the effluent from the dehydrogenation reactor will contain large quantities of relatively non-condensable gases, such as nitrogen. The gaseous effluent will also contain varying amounts of steam. It is one of the principal objects of this invention to provide a process for the separation of the carbonyl and other oxygenated compounds from the gaseous stream containing the hydrocarbons.

The oxygenated compounds are a serious contaminant in the unsaturated hydrocarbon product and must be essentially completely removed in order to have a product of suitable purity, e.g., a product having on the order of a few parts per million carbonyl compounds. The essentially complete removal of the oxygenated compound is quite difficult for several reasons. In the first place, the oxygenated compounds constitute only a very minor percentage of the gaseous stream to be purified. Normally the carbonyl compounds will only constitute less than 5 mol percent of the gaseous stream to be purified and more usually may constitute such as less than or up to 2.5 mol percent of the gaseous stream. The oxygenated compounds are therefore quite difficult to remove because of their low concentrations in the gaseous stream. In addition, the oxygenated compounds may be difficult to separate from the hydrocarbons regardless of their relative concentration. Azeotropes may form between the oxygenated compounds and various hydrocarbons. For instance, an azeotrope is formed between acetaldehyde and butadiene-1,3. It is therefore an object of this invention to promote a process for the essentially complete removal of carbonyl compounds from a gaseous stream containing only minute quantities of carbonyl compounds based on the total gaseous stream.

According to this invention, a straightforward and efficient process has been provided for the treatment of the gaseous stream to separate the oxygenated compounds. According to this invention the gaseous stream is intimately contacted under critical process conditions with an aqueous contacting composition. In one aspect of this invention, a portion of the unsaturated hydrocarbon is selectively dissolved in the aqueous contacting composition. The dissolved unsaturated hydrocarbon is then preferably separated from the aqueous contacting composition.

The gaseous mixture to be treated containing the unsaturated hydrocarbon, non-condensable gases and carbonyl compounds may be obtained from a variety of sources. However, the invention is particularly suitable for the purification of gaseous effluents resulting from the oxidative dehydrogenation of hydrocarbons utilizing air or oxygen diluted with non-condensable diluents such as nitrogen or helium. Examples of oxidative dehydrogenation processes are disclosed, e.g., in Examples II and III of U.S. 3,067,272 and in British Patent 956,048.

Hydrocarbons to be dehydrogenated may be acyclic, cycloaliphatic or alkyl aryl hydrocarbons of 3 to 9 carbon atoms which contain at least two adjacent carbon atoms, each of which carbon atom has at least one hydrogen atom attached. The dehydrogenation will produce compounds having double and/or triple bonds. Thus, butadiene-1,3 and/or vinylacetylene may be produced from butene-1 or butene-2 or mixtures thereof, and isoprene may be produced from any of the methyl butenes, such as 2-methyl butene-1, 2-methyl butene-2 or 3-methyl butene-1 or mixtures thereof. Isoprene may also be produced from methyl butanes, such as 2-methyl butane. Olefins and diolefins may be produced from saturated hydrocarbons; for example, vinyl acetylene, butadiene and butene or mixtures thereof may be produced from n-butene. A mixture of monoolefins and diolefins may also be produced such as a mixture of butadiene-1,3 and butenes from a feedstock of a mixture of n-butane and butene. Cyclohexane may be dehydrogenated to cyclohexene and/or benzene. Ethyl benzene or ethyl cyclohexane may be dehydrogenated to styrene. Good results have been obtained with a feed containing at least 50, such as at least 75, mol percent of an acyclic aliphatic hydrocarbon, such as the hydrocarbons of 4 to 5 carbon atoms having a straight chain of at least four carbon atoms, e.g., those having a single double bond, preferred are the monoethylenically unsaturated compounds or mixtures of saturated and monoethylenically unsaturated compounds.

Oxygen will generally be supplied to the dehydrogenation zone in the range of about 0.20 mol of oxygen to 2.0 or 3.0 mols of oxygen per mol of hydrocarbon to be dehydrogenated. A preferred range for the oxygen is from about 0.3 to 1.50 mols of oxygen per mol of hydrocarbon to be dehydrogenated. Either air, oxygen, or oxygen diluted with a diluent such as nitrogen, helium, and the like, may be utilized. Steam may be fed to the dehydrogenation zone in amounts such as from about 2 to 40 mols of steam per mol of hydrocarbon to be dehydrogenated. An advantageous range is from 2 to 20 mols of steam per mol of hydrocarbon.

A preferred embodiment of the invention is illustrated in the drawing. A gaseous mixture of the hydrocarbon to be dehydrogenated, air and steam are fed by line 1 to the dehydrogenation zone A. The dehydrogenation reaction may be conducted in the absence of contact catalysts, but better results are obtained if the reaction is conducted in the presence of metal or metal compound catalysts. The dehydrogenation reactor may be a fixed or fluid bed reactor. Reactors conventionally used for the dehydrogenation of hydrocarbons to butadiene may be employed. The total pressure in the dehydrogenation zone may suitably be about atmospheric pressure. However, higher pressures or vacuum may be used. Pressures such as from about atmospheric (or below) up to about 100 to 200 p.s.i.g. may be employed. The dehydrogenation reaction will normally be conducted at a temperature of reaction between about 600° F. to about 1500° F. or higher, although generally the maximum temperature in the reactor will be within the range of about 700° F. and 1300° F. The temperature of the reaction is measured at the maximum temperature in the reactor. The flow rates of the reactants may be varied quite widely and will be dependent somewhat on whether fixed or fluid bed reactor is employed. Good results have been obtained with flow rates of the hydrocarbon to be dehydrogenated ranging from about ¼ to 25 liquid volumes of hydrocarbon to be dehydrogenated per volume of reactor per hour, with the volumes of hydrocarbon being calculated as the equivalent amount of liquid hydrocarbons at standard conditions of 15.6° C. and 760 millimeters of mercury absolute. For the purpose of calculating flow rates, the reaction zone is defined as the portion of the reactor which contains catalyst and which is at a temperature of at least 600° F. In other words, the volume of the reaction zone is equivalent to the empty volume of the catalyst zone. The residence or contact time of the reactants in the dehydrogenation zone depends on several factors involved in the reaction. Contact times such as about 0.001 to about 5, 10 or 20 seconds have been found to give excellent results. Under certain conditions, higher contact times may be utilized. Contact time is the calculated dwell time of the reaction mixture in the reaction zone assuming the mols of product mixture are equivalent to the mols of feed.

The effluent 2 from the dehydrogenation zone will contain the impure unsaturated hydrocarbon products, various impurities including oxygenated hydrocarbons, noncondensable gases and perhaps some unconverted feed or unconverted hydrocarbon, oxygen and steam. If air were used as the source of oxygen, nitrogen will be present in relatively large quantities as a noncondensable gas. Steam may be present in an amount up to 96 mol percent of the total effluent, such as from about 5 to 96 mol percent. The organic phase including dehydrogenated product, any unreacted feed, oxygenated hydrocarbons, polymer and tar and precursors thereof and any organic decomposition products usually range from about 1 to 50 mol percent of the effluent and generally will be within the range of or about 3 to 30 or 35 mol percent of the effluent. The noncondensable gases,[1] such as nitrogen or $CO_2$, will usually be present in an amount of from or about 20 to 93 mol percent of the total effluent, but more often will be within the range of about 40 to 80 mol percent.

The effluent gases 2 leaving the dehydrogenation zone will generally be at a temperature of about or greater than 600° F. or 700° F. to 1600° F. depending upon the particular dehydrogenation process. The reactor effluent may be cooled by any means or combination of means in cooling zone B as by quenching followed by employing waste heat boilers, condensers, vapor separators, and the like. Preferably water, such as the major portion of any water present in the effluent, will be removed as condensed steam from the gaseous effluent during this cooling operation. This cooled gaseous stream 3 may preferably then be compressed and conducted to the contacting zone C.

The gaseous composition 3 to be fed to contacting zone C will comprise, exclusive of any water present, about or from 3.5 to 80 mol percent of unsaturated hydrocarbon, about or from 0.005 to 2.5 mol percent of carbonyl compounds,[2] and about or from 20 to 93 mol percent of noncondensable gases (i.e., noncondensable under the conditions of zone C), all based on the total mols of gaseous composition 3 being fed to contacting zone C, exclusive of any water. Included in the noncondensable gases will be any nitrogen, oxygen, CO or $CO_2$, and the like. The oxygen content may vary, but suitably will be less than 10 mol percent of 3. Steam may also be present in 3 in an amount from 0 to 20 or up to such as 50 mol percent of the gaseous composition 3. Also present in the gaseous mixture 3 may be unconverted hydrocarbons such as olefins or saturated hydrocarbons and hydrocarbon by-products.

A preferred composition 3 to be fed to zone C will comprise, exclusive of any water present, about or from 5 to 65 mol percent of unsaturated hydrocarbons, about or from 0.05 to 1.2 mol percent of carbonyl compounds and about or from 45 to 89 mol percent of the noncondensable gases. A particularly preferred composition 3 contains about or from 8 to 65 mol percent butadiene-1,3, about or from 0.1 to 40 mol percent butene, and about or from 40 to 75 mol percent nitrogen.

The contacting zone C may comprise any type of equipment or apparatus for intimately contacting gases and liquids, such as tray columns including cross-flow plate and counterflow plate types, bubble cap columns, packed columns and spray systems including spray towers (open or packed), cyclonic spray towers, venturi scrubbers, and so forth. Preferred contacting equipment is plate columns (may be perforated, valve, bubble cap, and so forth) and packed columns.

The process conditions within the contacting zone are critical and are an essential part of this invention. The conditions in the contacting zone C must be such that under the pressure in zone C the temperature will be from at least as high as the dew point of the unsaturated hydrocarbon being fed in 3 to a temperature of less than the boiling point of water under the conditions in zone C. Also, the conditions in zone C will be maintained such that the phase equilibrium constants $K$[3] for the carbonyl compounds will be no greater than 15 and preferably will be 10 or less. Preferred $K$ values are from .1 to 6. Preferably, the contacting zone will be at a pressure of at least 30 p.s.i.a., such as at least 60 p.s.i.a. When the unsaturated hydrocarbon in 3 is a $C_4$ or $C_5$ hydrocarbon or mixtures thereof, the contacting zone will be maintained at a temperature between about 60° F. and 180° F. For example, if a column type contacting zone is utilized both the bottoms and the overhead temperature must be within the temperature range of 60° F. and 180° F. Preferably, the temperature in the contacting zone will remain between about 80° F. and 110° F. for $C_4$ hydrocarbons and between 120° F. and 160° F. for $C_5$ hydrocarbons. When the hydrocarbons are $C_4$ to $C_5$, the pressure in the contacting zone will preferably be maintained within the range of about 110 p.s.i.a. to 170 p.s.i.a. and better results are obtained if the pressure is within the range of about 130 to 170 p.s.i.a.

In the contacting one C the composition 3 is contacted with an aqueous composition 4 and the contacting may be by any of the means described above. Preferably, the aqueous composition 4 will contact the gases 3 via countercurrent flow as shown in the drawing. Water may be used as the composition 4, but preferably an aqueous composition of high pH will be utilized, such as a composition having a pH of at least 10 or more suitably at least 11 or 12. The high pH may be obtained by NaOH or by other basic materials.

The exit gases 7 from the contacting zone comprise or consist of about or from 3.5 to 80 mol percent unsaturated hydrocarbons and about or from 20 to 93 mol percent noncondensable gases. The exit gases preferably comprise or consist of 5 to 65 mol percent of unsaturated hydrocarbons and from 45 to 89 mol percent noncon-

---

[1] The term "noncondensable" or "inert noncondensable" gases refers to those gases, other than hydrocarbons, such as nitrogen, $CO_2$ and CO, which do not condense under the conditions encountered.

[2] All references to overall quantities of carbonyl compounds are determined by ASTM Method D–1089 and reported as acetaldehyde. Generally, the carbonyl compounds will have from 2 to 8 carbon atoms, e.g., from 2 to 6 carbon atoms when a $C_4$ to $C_6$ compound is being dehydrogenated, and will have from 1 to 2 carbonyl groups.

[3] Mol fraction in vapor phase divided by mol fraction in liquid phase. Typical calculations for gaseous-liquid compositions may be found, e.g., in the article by Wayne C. Edmister reprinted as Part 5 of the Hydrocarbon Absorption and Fractionation Process Design Methods published by Petro/Chem Engineer, Dallas, Texas.

densable gases. At least 90 mol percent of the carbonyl compounds entering the contacting zone as 3 will be removed from the gaseous stream in the contacting zone and generally higher mol percent removal is achieved such as at least 97 percent or at least 99 mol percent removal.

Also from the contacting zone will be taken off an aqueous solution 5 which contains water and dissolved therein based on the total mols of the aqueous solution about or from 0.01 to 2.5 mol percent carbonyl compounds, and preferably from about 0.025 to 1.0 mol percent carbonyl compounds. In order to achieve the maximum overall benefit from this invention, it has been found advantageous to operate the contacting zone in a manner and under conditions such that a portion of the unsaturated hydrocarbon entering the contacting zone C will be dissolved in the aqueous solution 5. The dissolved hydrocarbon in the aqueous solution 5 amounts to about or from 0.005 to 0.5 mol percent of unsaturated hydrocarbon of the composition 5 and this dissolved unsaturated hydrocarbon may be equivalent to about or from 0.002 to 4.0 mols percent of the unsaturated hydrocarbon entering the contacting zone C in the stream 3. According to a suitable operation the aqueous solution 5 contains dissolved therein from 0.01 to 2.0 mols percent of the unsaturated hydrocarbons. The unsaturated hydrocarbons so dissolved in the aqueous solution 5 may then be discarded, but it is a feature of this invention that the unsaturated hydrocarbons may be separated in a high purity from the carbonyl compounds in a separator D. The sunsaturated hydrocarbon 6 has been found to be of high purity in terms of freedom from carbonyl compounds even though there is a high ratio of carbonyl compounds to unsaturated hydrocarbons in the aqueous stream 5.

The separator D may be any suitable apparatus or combination of apparatus for separating the unsaturated hydrocarbons from the aqueous composition. The unsaturated hydrocarbon may be separated such as either by heating the aqueous composition or by reducing the pressure on the composition or by a combination thereof. Generally in the separator at least 50 mol percent of the unsaturated hydrocarbons in 5 are recovered as 6 and at least 90 mol percent of the carbonyl compounds in 5 are in the aqueous composition discharged as stream 8.

The unsaturated hydrocarbon 6 may be recycled upstream to feed 3 or may be treated separately or recycled otherwise. The unsaturated hydrocarbon stream 7 may then be further purified and separated into components in the purification Section E, such as by fractional distillation. The product 9 is a high purity unsaturated hydrocarbon containing only an insignificant quantity of carbonyl compounds, such as less than 250 molar p.p.m. and more preferably less than 100 molar p.p.m. carbonyl compounds based on the unsaturated hydrocarbons.

The invention can best be illustrated by a specific example. Reference is made to the drawing for the various pieces of equipment and streams. Butene-2 is dehydrogenated to butadiene-1,3 in Reactor A. The feed 1 to the reactor consists of butene-2, air and steam. The effluent 2 from the reactor comprises butadiene-1,3, unreacted butene, carbonyl compounds, steam, noncondensable gaseous components such as nitrogen and various dehydrogenation by-products such as $CO_2$. After cooling and removal of some of the water, the composition 3 consists of 71.1 mol percent noncondensable gases (mostly nitrogen, but also includes the other residual gases of air, as well as CO and $CO_2$) and 28.1 mol percent hydrocarbons. The hydrocarbon portion is constituted mostly of $C_4$'s and it comprises 57 mol percent butadiene-1,3. The composition 3 also contains 0.6 mol percent water as steam and 0.2 mol percent carbonyl compounds. The breakdown of the carbonyl compounds by mol percent is as follows: 1.48 percent acetaldehyde, .035 percent acrolein, .009 percent methacrolein, .005 percent crotonaldehyde, .002 percent methyl vinyl ketone and .001 percent formaldehyde. The molecular weight of the gaseous stream 3 is about 36 and the temperature of the gaseous feed is 100° F. The contacting zone C consists of a tray type tower having 40 actual trays. The aqueous composition feed 4 is fed at the top of the tower and has a temperature of 92° F. and a pH of about 11.0. The pH of 4 is maintained by the use of NaOH. The overhead temperature of the column is 92° F. and the bottoms temperature of the column is 95° F. The overhead pressure of the column is 127 p.s.i.g. and the bottoms pressure is 133 p.s.i.g. The feed rates of the gaseous composition 3 and the aqueous composition 4 are equivalent to 1.7 mols of water from the aqueous composition 4 per mol of the gaseous composition 3. In the contacting zone C, 99.6 mol percent of the carbonyl compounds and 0.2 mol percent of the hydrocarbons in the gaseous composition 3 are absorbed in the aqueous composition 5. The bottoms aqueous composition 5 consists of 0.11 mol percent carbonyl compounds and 0.04 mol percent hydrocarbons. The pH of the aqueous composition 5 is about 6.0.

The aqueous composition 5 is then transferred to the separator D. The separator D is a horizontal cylindrical vessel. The inlet stream 5 is admitted to the vessel near one end. Near the inlet end of the vessel is a vertical baffle. The pressure in the separator is maintained at 17 p.s.i.a. and the temperature is maintained at 110° F. by the introduction of a hot water stream to D. The flashed vapors leave the separator through a nozzle located at the top of the vessel midway between the ends. The liquid stream 8 from the separator leaves through the bottom of the vessel at the end opposite the gaseous inlet. The gaseous composition 6 leaving the separator contains equivalent to 75 mol percent of the hydrocarbons entering the separator as 5. Only 0.5 mol percent of the carbonyl compounds entering the separator as 5 are taken overhead in the gaseous stream 6. The remainder of the carbonyl compounds leave the separator in the aqueous composition 8.

The gaseous composition 6 containing the unsaturated hydrocarbons is recycled to feed 3. The gaseous composition 7 from zone C then has the following mol percent composition: 71.3 percent noncondensable inert gases, 28.1 percent hydrocarbon, 0.06 percent water as steam and less than 0.3 mol of carbonyl compounds per million mols of gaseous composition 6.

This gaseous composition is then separated and purified in order to produce butadiene-1,3 of high purity in the purification zone E.

We claim:

1. A process for the purification of unsaturated hydrocarbons contaminated with carbonyl compounds from a gaseous mixture having exclusive of any water present from about 2.5 to 80 mol percent of the said unsaturated hydrocarbon and from about 20 to 93 mol percent of noncondensable gases which comprises:

(1) intimately contacting the said gaseous mixture with contacting water of a pH of at least 10 in a contacting zone, the said contacting zone being maintained at a temperature from at least the dew point of the said unsaturated hydrocarbon to less than the boiling point of water under the conditions in the contacting zone and under conditions such that the phase equilibrium constants of the said carbonyl compounds are no greater than 15, (2) taking off from the said contacting zone exclusive of any water present a gaseous mixture comprising from about 3.5 to 80 mol precent of the said unsaturated hydrocarbon and from about 20 to 93 mol percent of the said inert noncondensable gas, (3) removing an aqueous solution from the contacting zone, the said aqueous solution containing dissolved therein based on the total mols of the aqueous solution from about 0.01 to 2.5 mol percent carbonyl compounds and from 0.005 to 0.5 mol percent of the said unsaturated hydrocarbon, the said carbonyl compound dissolved in the aqueous solution being equivalent to at least about 90 mol percent of the carbonyl compound entering the contacting zone in the said gaseous mixture, and (4) purifying the said gaseous mixture taken off in step (2) to produce purified unsaturated hydrocarbon containing only minute quantities of the said carbonyl compounds.

2. The process of claim 1 wherein the said unsaturated hydrocarbon has from 3 to 9 carbon atoms.

3. The process of claim 1 wherein the said unsaturated hydrocarbon comprises a member selected from the group consisting of n-butene, methyl pentene, butadiene-1,3, isoprene, and mixtures thereof.

4. The method of claim 1 wherein the said contacting zone is maintained at a pressure of from about 110 p.s.i.a. to 170 p.s.i.a. and the temperature is maintained from about 60° F. and 180° F.

5. A process for the purification of an unsaturated hydrocarbon selected from the group consisting of butadiene-1,3, isoprene and mixtures thereof contaminated with aliphatic carbonyl compounds from a gaseous mixture having, exclusive of any water present, from about 5 to 65 mol percent of the said unsaturated hydrocarbon and from about 45 to 89 mol percent of noncondensable gases which comprises:

(1) intimately contacting the said gaseous mixture with contacting water of a pH of at least 10 in a contacting zone, the said contacting zone being maintained at a temperature between about 60° F. and 180° F. and at a pressure of between about 110 p.s.i.a. and 170 p.s.i.a., the said contacting zone being maintained under conditions such that the phase equilibrium constants of the said carbonyl compounds are no greater than 10.

(2) taking off from the said contacting zone, exclusive of any water present, a gaseous mixture comprising from about 3.5 to 80 mol percent of the said unsaturated hydrocarbon and from about 20 to 93 mol percent of the said inert noncondensable gas, (3) removing an aqueous solution from the contacting zone, the said aqueous solution containing dissolved therein based on the total mols of the aqueous solution from about 0.01 to 2.5 mol percent carbonyl compounds and from 0.005 to 0.5 mol percent of the said unsaturated hydrocarbon, the said carbonyl compound dissolved in the aqueous solution being equivalent to at least about 90 mol percent of the carbonyl compound entering the contacting zone in the said gaseous mixture, (4) in a separate step heating the said aqueous solution to a temperature at least high enough to strip dissolved unsaturated hydrocarbon from the said aqueous solution, and (5) purifying the said gaseous mixture taken off in step (2) to produce purified unsaturated hydrocarbon containing only minute quantities of the said carbonyl compounds.

6. The process of claim 5 wherein the said gaseous mixture has been obtained by dehydrogenating in a dehydrogenation zone a hydrocarbon of 4 to 5 carbon atoms in the presence of oxygen diluted with inert diluents, the effluent from the dehydrogenation zone thereafter being cooled in order to separate the major portion of water in the stream and thereafter compressed prior to contacting according to (1) of claim 5.

No references cited.

DELBERT E. GANTZ, *Primary Examiner.*

G. E. SCHMITKONS, *Assistant Examiner.*